(No Model.)
A. WOOD.
NAIL TONGS.
No. 376,220. Patented Jan. 10, 1888.
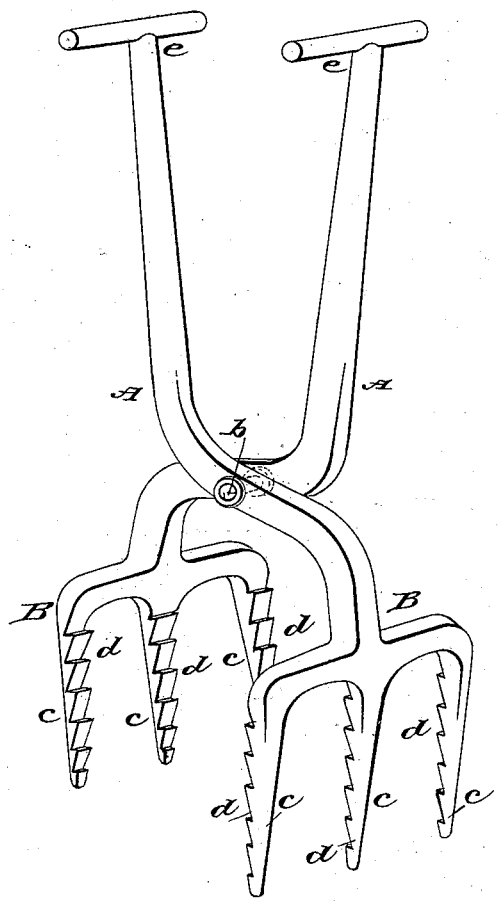
WITNESSES:
INVENTOR:
A. Wood
BY Munn & Co
ATTORNEYS.

UNITED STATES PATENT OFFICE.

ANDREW WOOD, OF WASHINGTON, KENTUCKY.

NAIL-TONGS.

SPECIFICATION forming part of Letters Patent No. 376,220, dated January 10, 1888.

Application filed June 2, 1887. Serial No. 240,111. (No model.)

*To all whom it may concern:*

Be it known that I, ANDREW WOOD, of Washington, in the county of Mason and State of Kentucky, have invented a new and useful Improvement in Nail-Tongs, of which the following is a full, clear, and exact description.

This invention relates to a hand implement or tool known as a "nail tongs" or "grab" for facilitating the picking up—as from kegs or other receptacles—of nails in quantities and conveying or transferring them to the counter-scale, for instance, in a retail store, or wherever it is required to deposit them.

My invention consists in a tongs or grab of novel construction for the purpose, in which the crossing levers or handle portions of the tongs are extended to form jaws composed of a limited number of internally notched or serrated tines, and are pivoted to each other in closer proximity to the bent tine portions than to their hand-holding ends, substantially as hereinafter described, and pointed out in the claim.

Reference is to be had to the accompanying drawing, forming a part of this specification, in which the drawing represents a view in perspective of a nail tongs or grab embodying my invention.

A A are the two crossing bars of the implement, pivoted to each other, as at $b$, much nearer to the inner or acting end of the tongs than to the upper or outer end thereof, whereby a more effective leverage is obtained for the tongs. The inner end portions of said bars or levers are bent and united with or made to form two opposite jaws, B B, each of which is composed of or terminates in approximately parallel tines $c\ c$, that are notched or recessed on their inner faces, as shown at $d$. Practically I find that three prongs or tines for each jaw answer best, as if more be used a difficulty is experienced in thrusting them down into the keg among the nails from which the draft is to be made by the retailer, carpenter, or whoever else may be using the tongs, while with three prongs for each jaw, if properly spaced and the jaws be properly spread, said tines or prongs readily enter down among the nails in the keg, and either a large or small lift of nails may be made, as desired. The notched or toothed construction of the tines $c$ on their inner faces, as shown at $d$, also adds very materially to the lift of the nails by the implement and prevents the slipping and dropping of the nails being lifted by the jaws, so that a much larger quantity of nails may be taken at any one time from the keg without risk of their dropping loose. Of course the quantity will mainly depend upon the depth to which the grabbing ends of the tongs are projected down into the nails in the keg. Very many pounds, however, may be lifted at any one time, if desired, or a single pound or less, if necessary.

An important feature in connection with the serrated construction of the tines for making an easy lift and secure hold of the nails in a large quantity at a time is the increased leverage which is obtained by arranging the pivot $b$ of the tongs so much nearer the tine end of the implement than the hand-holding end thereof, and the fact that both hands may be applied to work the tongs—as, for instance, by cross-handles $e\ e$ on the upper or outer ends of the levers A A.

Of course the tongs are manipulated as other tongs are to make and release their hold of the goods.

Having thus described my invention, what I claim as new, and desire to secure by Letters Patent, is—

As an improved article of manufacture, a nail-tongs comprising the crossed levers A, curved outward in opposite directions from their pivotal point $b$, and then downward, and the series of tines at the lower end of each lever having their inner faces toothed or notched, as at $d$, the upper ends of the levers being disconnected and each formed with a hand-hold, substantially as set forth.

ANDREW WOOD.

Witnesses:
E. C. MYALL,
G. T. BARBOUR.